US009071465B1

(12) United States Patent
Schroeder

(10) Patent No.: US 9,071,465 B1
(45) Date of Patent: Jun. 30, 2015

(54) METHOD AND SYSTEM FOR SMS SERVICES AND BIND SCALING

(75) Inventor: Derek Andrew Schroeder, Caldwell, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 1167 days.

(21) Appl. No.: 12/782,358

(22) Filed: May 18, 2010

(51) Int. Cl.
*H04L 12/801* (2013.01)
*H04L 12/58* (2006.01)
*H04W 4/14* (2009.01)
*H04W 4/12* (2009.01)

(52) U.S. Cl.
CPC ............ *H04L 12/5895* (2013.01); *H04W 4/14* (2013.01); *H04L 47/10* (2013.01); *H04W 4/12* (2013.01)

(58) Field of Classification Search
CPC ..... H04L 29/06; H04L 47/10; H04L 12/5895; H04W 4/14
USPC ................. 709/225, 230, 232, 233, 235, 238; 455/466; 370/229, 231, 232, 233, 234, 370/235, 235.1, 236, 236.1, 236.2
See application file for complete search history.

(56) References Cited

U.S. PATENT DOCUMENTS

| 6,515,963 | B1 * | 2/2003 | Bechtolsheim et al. ...... 370/229 |
| 6,965,777 | B1 * | 11/2005 | Cast et al. ...................... 455/466 |
| 6,975,876 | B1 * | 12/2005 | Cast et al. ...................... 455/466 |
| 7,003,307 | B1 * | 2/2006 | Kupsh et al. ................... 455/466 |
| 7,020,712 | B1 * | 3/2006 | Chin .............................. 709/234 |
| 7,215,970 | B2 * | 5/2007 | Corrigan et al. ............... 455/466 |
| 7,330,479 | B2 * | 2/2008 | Barker et al. .................. 370/419 |
| 7,352,706 | B2 * | 4/2008 | Klotz et al. .................... 370/254 |
| 7,561,590 | B1 * | 7/2009 | Walsh ............................ 370/416 |
| 7,688,736 | B1 * | 3/2010 | Walsh ............................ 370/236 |
| 7,706,303 | B2 * | 4/2010 | Bose et al. ..................... 370/254 |
| 7,895,353 | B2 * | 2/2011 | Jansson ......................... 709/233 |
| 8,005,079 | B1 * | 8/2011 | Walsh ............................ 370/363 |
| 8,145,759 | B2 * | 3/2012 | Bhogi et al. ................... 709/226 |
| 8,413,156 | B2 * | 4/2013 | Kasten et al. .................. 718/104 |
| 2002/0176429 | A1 * | 11/2002 | Calvignac et al. ............ 370/411 |
| 2003/0003932 | A1 * | 1/2003 | Corrigan et al. .............. 455/466 |
| 2004/0017819 | A1 * | 1/2004 | Kagan et al. .................. 370/412 |
| 2004/0088413 | A1 * | 5/2004 | Bhogi et al. ................... 709/226 |
| 2005/0068971 | A1 * | 3/2005 | Meisl et al. .................... 370/401 |
| 2006/0099959 | A1 * | 5/2006 | Staton et al. ............... 455/456.1 |
| 2006/0133278 | A1 * | 6/2006 | Hill et al. ....................... 370/235 |
| 2007/0115846 | A1 * | 5/2007 | Kooyers et al. ............... 370/252 |
| 2007/0291778 | A1 * | 12/2007 | Huang et al. .................. 370/410 |

(Continued)

OTHER PUBLICATIONS

Ebrahimi et al., Fairness via source throttling: a configurable and high-performance fairness substrate for multi-core memory systems, ACM SIGPLAN Computer Architure News—vol. 38 Issue 1, Mar. 2010 pp. 335-346.*

(Continued)

*Primary Examiner* — Jimmy H Tran

(57) ABSTRACT

Method and system for message service via network connections, for example, in the context of a mobile communication network. A request is received by a message server located in a cluster of one or more message servers to send a message to a specified recipient. A bind request mechanism accesses an available bind from a bind pool managed in accordance with, at least in part, an operational parameter of a routing entity. Using the available bind, the message server sends the message, through a routing entity interface via a network, to the routing entity which subsequently forwards the message to the specified recipient.

25 Claims, 11 Drawing Sheets

(56) References Cited

U.S. PATENT DOCUMENTS

| | | | |
|---|---|---|---|
| 2008/0228923 A1* | 9/2008 | Chidambaran et al. | 709/227 |
| 2008/0250419 A1* | 10/2008 | Kasten et al. | 718/104 |
| 2009/0247198 A1* | 10/2009 | Lewis et al. | 455/466 |
| 2009/0318174 A1* | 12/2009 | Tarleton et al. | 455/466 |
| 2010/0228840 A1* | 9/2010 | Bose et al. | 709/221 |
| 2011/0085475 A1* | 4/2011 | Sinivaara et al. | 370/277 |
| 2011/0106931 A1* | 5/2011 | Smith | 709/223 |
| 2012/0239771 A1* | 9/2012 | Rasanen | 709/206 |

OTHER PUBLICATIONS

Larsen et al., Architectural Breakdown of End-to-End Latency in a TCP/IP Network, International Journal of Parallel Programming Dec. 2009, vol. 37, Issue 6, pp. 556-571.*

* cited by examiner

METHOD AND SYSTEM FOR SMS SERVICES AND BIND SCALING

BACKGROUND

1. Technical Field

The present teaching relates to methods, systems, and programming for telecommunications of notifications or the like, for example, via mobile network text messages.

2. Discussion of Technical Background

With the advancement of telecommunication technologies, wireless communications have expanded in recent decades from traditional voice communications to other types of communication forms such as data and text messages. Text message based communications include electronic mails and short messages. In recent years, short message service (SMS) has become ubiquitous and popular in both the United States and foreign countries because it is not only easy to do and often costs much less to an end user. FIG. 1(a) (Prior Art) illustrates a part of a traditional network configuration that supports SMS communications. In FIG. 1(a), a message server 140 receives an incoming short message request 130 to send a short message (either created based on a request or received) to a routing entity 170 via which the short message is to be delivered to specified destinations via a network 160 to a routing entity 170. For example, the routing entity 170 may send the short message to the intended recipient via a process (not shown) by forwarding the short message to another message server which may then connects to the intended recipient to deliver the message.

In this configuration, the message server 140 can be an external short message entity (ESME) server or a short message service center (SMSC) server. The routing entity 170 can be a short message peer to peer (SMPP) gateway, an ESME server, or a SMSC server. The source of the short message request 130 may be from automated applications that can generate or received high volumes of a messages. For example, a mobile service provider may have automated systems that use a message center such as an ESME server to send notifications to its customers regarding account activities or the like. For a large network service provider with many customers, the automated notifications may generate a high volume of SMS notification message traffic.

Traditionally, a message server such as 140 can connect with a routing entity via a single bind 150. That is, for each message to be sent from the message server 140 to the routing entity 170, the message server 140 sends the message to the routing entity 170. As multiple message servers may send and receive short messages from the same routing entity and the routing entity 170 usually has a limited capacity to handle the traffic, in order to manage the bandwidth of the traffic, a routing entity usually places a limit on each message server bind so that the number of text message notifications that can be sent per second via each message server bind is restricted. When such set limitation is exceeded, the message server bind will throttle and in that situation, the routing entity will reject notification requests on that bind for a configured period of time. During this period of time, as no text message is allowed to be sent, it introduces a stall on the message server and ultimately the communications desired by the message server will have no ability to send messages.

Efforts have been made to overcome this problem. FIG. 1(b) (Prior Art) shows a conventional solution to the problem. With this solution, the message server 140, as shown in FIG. 1(a), is replaced with a message server cluster 180, which comprises a plurality of message server nodes, 180-a, . . . , 180-b, each of which is associated with a single bind, 190-a, . . . , 190-b, respectively. Although this solution can alleviate the problem to some extent, once a bind associated with a message server throttles, the same problem occurs which still affects an application's ability to communicate and, thus, it does not provide much advantage. The reason that this conventional solution does not solve the problem is that throttles still occur at the individual bind level. Consequently, neither the traditional system, as shown in FIG. 1(a), nor an improvement thereof, as shown in FIG. 1(b), allows such an SMS communication platform to scale as the need to send or receive a greater number of short messages per second grows in applications, such as those used for automated notifications or the like. Therefore, a more effective solution to the problem mentioned is needed.

SUMMARY

The teachings disclosed herein relate to method, system, and program products for bind scaling on communications between a message server (such as an ESME server) and a routing entity (such as a SMPP gateway) for message services.

In one example, a message server located in a cluster of one or more message servers receives a request to forward a message to a specified recipient. To facilitate the message server to send the message to a routing entity, a bind request mechanism accesses an available bind from a bind pool that is managed in accordance with, at least in part, an operational parameter of the routing entity. Based on the available bind, the message server then sends, via a network, the message to the routing entity through which the message is to be forwarded to the specified recipient.

In another example, there are one or more message servers forming a cluster. Each of the message servers in the cluster receives a request to send a message to a specified recipient and sends the message to a routing entity that forwards the message to the specified recipient. Each message server includes a bind pool, a bind pooling mechanism, and a routing entity interface. The bind pool has a plurality of binds managed in accordance with, at least in part, an operational parameter of the routing entity. The bind pooling mechanism facilitates a selection of an available bind from the bind pool. The routing entity interface facilitates the message server to send, via a network, the message to the routing entity based on the selected available bind so that the message directed to the specified recipient can be forwarded to the specified recipient by the routing entity.

Other concepts relate to unique software for implementing the scalable binding between a message server and a routing entity. A software product, in accord with this concept, includes at least one machine-readable medium and information carried by the medium. The information carried by the medium may be executable program code data regarding bind related parameters, such as the pool, established binds, etc. When such information carried by the medium is read by a machine, it causes the machine to perform programmed functions. In one example, a message server located in a cluster of one or more message servers executes instructions recorded on a medium and is capable of receiving a request to forward a message to a specified recipient. To send the message to a routing entity, instructions associated with a bind request functional mechanism are executed to access an available bind from a bind pool that is managed in accordance with, at least in part, an operational parameter of the routing entity. Based on the available bind, the message server executes additional instructions to send, via a network, the message to the routing entity through which the message is to be forwarded to the specified recipient.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1A:
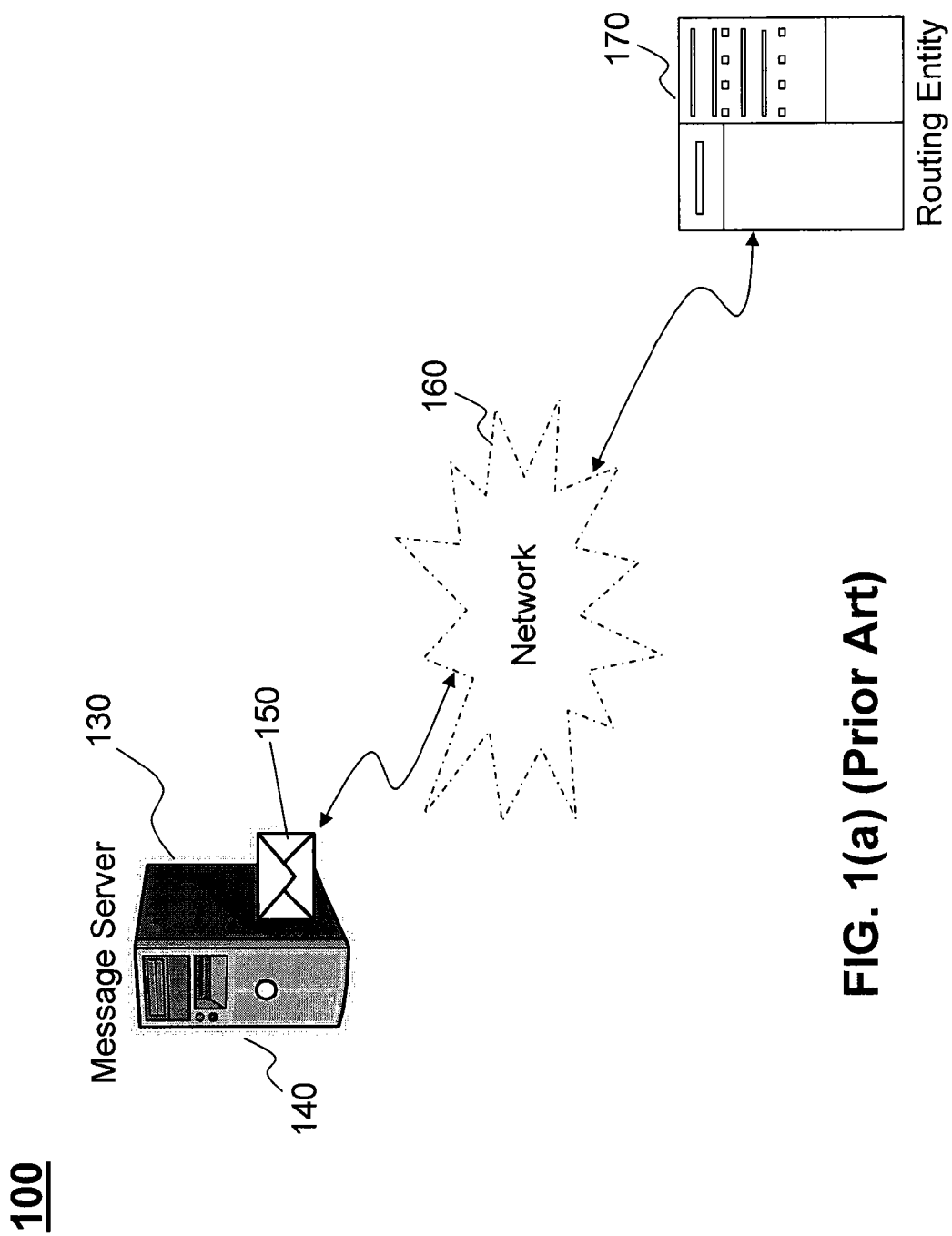
FIG. 1(a) (Prior Art) shows a conventional system configuration that supports short message notification applications.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to apparatus and method for mobile network message services. A system configuration and method are disclosed in which a server responsible for forwarding messages, to be delivered to a specified destination, to a gateway utilizes a bind pooling mechanism that allows each bind to be used to connect the server with a gateway in a manner that minimizes throttles. Although the present teaching is disclosed herein with examples related to SMS service in connection with message servers and their communications with routing entities, it is to be understood that the disclosed teaching can be applied to other types of networked message services. Examples of other applicable messaging services, in the mobile network context at least, include Enhanced Messaging Service (EMS) and Mobile Multimedia Service (MMS). In addition, although the illustrations provided herein often refer to specific types of message server, e.g., an ESME server, and routing entity, e.g., a SMPP gateway, in a point A to point B message forwarding configuration, it is understood that an ESME server at point A in the disclosed configurations can also be a SMSC or a SMPP server. Similarly, a SMPP gateway illustrated herein as point B can also be an ESME or a SMSC gateway. That is, the bind pooling method, system, and software products, as disclosed herein, can be deployed in not only an ESME server but also in a SMSC or SMPP server or any future intermediary message server (point A) which can effectively utilize a bind from a bind pool to send from the intermediary message forwarding server to point B gateway, which can be a SMPP gateway, an ESME gateway, a SMSC gateway, or any future point B gateway in order to forwarding a message from one point to another.

In the context of SMS services, a message server cluster receives a short message request, coming from, e.g., a network application, via network connections, and creates and/or forward, via a network, the created short message to a routing entity which will then forward the short message to its intended destination. The message server cluster comprises one or more message servers and each message server is associated with a bind pool having a plurality of binds therein and managed in accordance with a bind pooling mechanism operated in accordance with, at least in part, the operational parameters of a routing entity to which the ESME server cluster is connected. The bind pooling mechanism disclosed herein prevents the throttle from occurring. Details of the present teaching are discussed below with respect to FIGS. 2-8.

Figure 2:
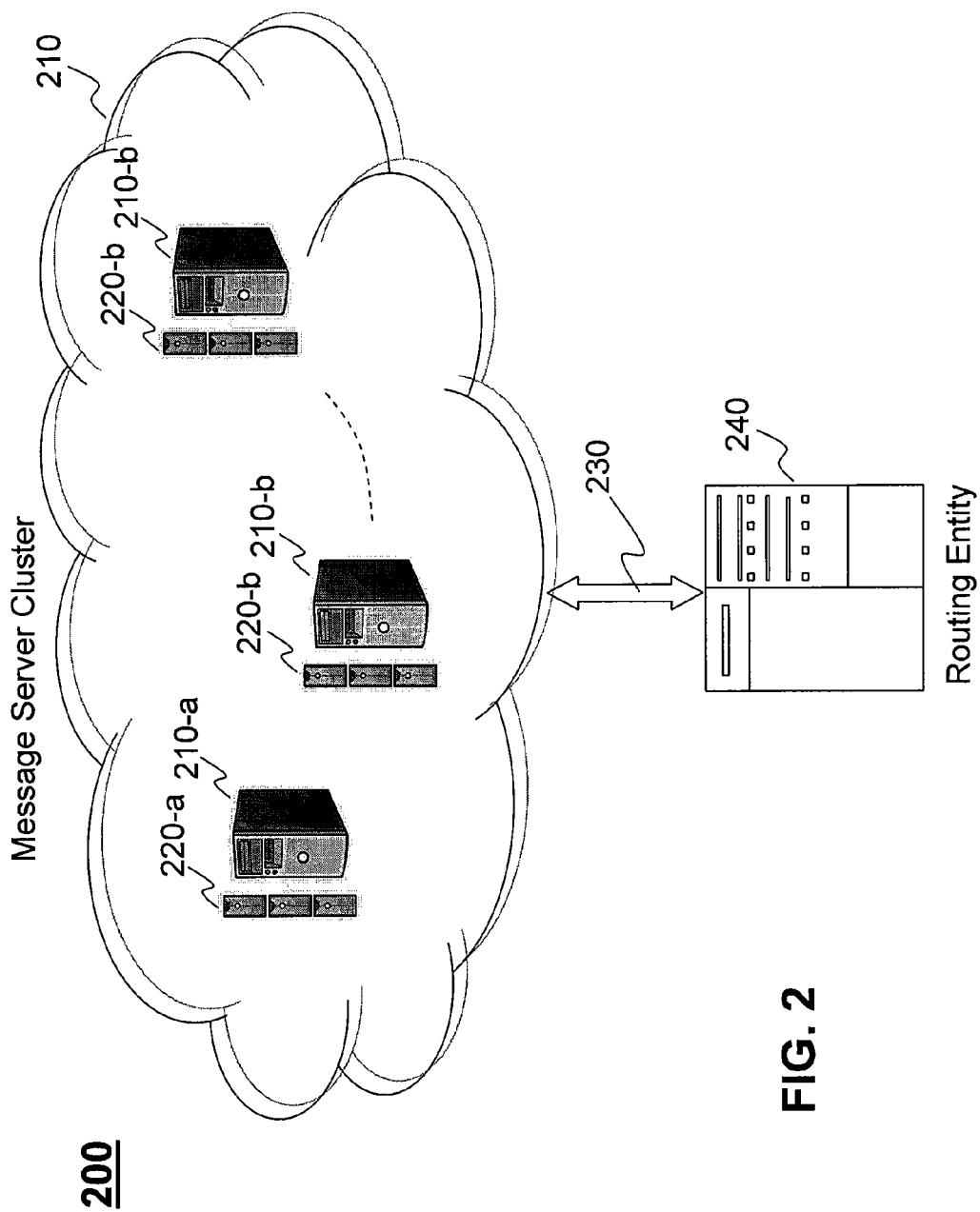
FIG. 2 depicts a message server cluster configuration that supports SMS services, according to an embodiment of the present teaching.

FIG. 2 depicts a message server cluster configuration 200 that supports message services, according to an embodiment of the present teaching. In the illustrated configuration, a message server cluster 210 is connected to a routing entity 240 via a network connection 230. As mentioned above, the message server cluster 210 can be an ESME server, a SMSC, or SMPP server cluster or any future intermediary message server cluster responsible for forwarding messages to a routing entity. The message server cluster 210 can also comprise a combination of different types of servers including ESME, SMSC, SMPP, and future intermediary message forwarding servers. Similarly, the routing entity 240 can be a SMPP gateway, an ESME, SMSC gateway, or any future message gateway. Although discussions below may sometimes refer to particular type of message server or routing entity, a person skilled in the art would readily recognize that the disclosure herein is applicable to different types of message forwarding intermediary servers or message gateways.

The message server cluster 210 includes one or more message servers 210-a, 210-b, . . . , 210-c. Each message server is associated with a corresponding bind pool, 220-a, 220-*b*, . . . , 220-*c*, respectively. Each of the bind pools has more than one bind and they are used to bind the underlying message server to the routing entity 240. Each bind in a bind pool is configured to operate in accordance with some parameters that are determined based on the operational parameters of the routing entity 240. In addition, each bind pool associated with a corresponding message server is to be managed in accordance with a schedule related to the operation of the routing entity 240. Details of each aspect of the present teaching are provided below.

Figure 1B:
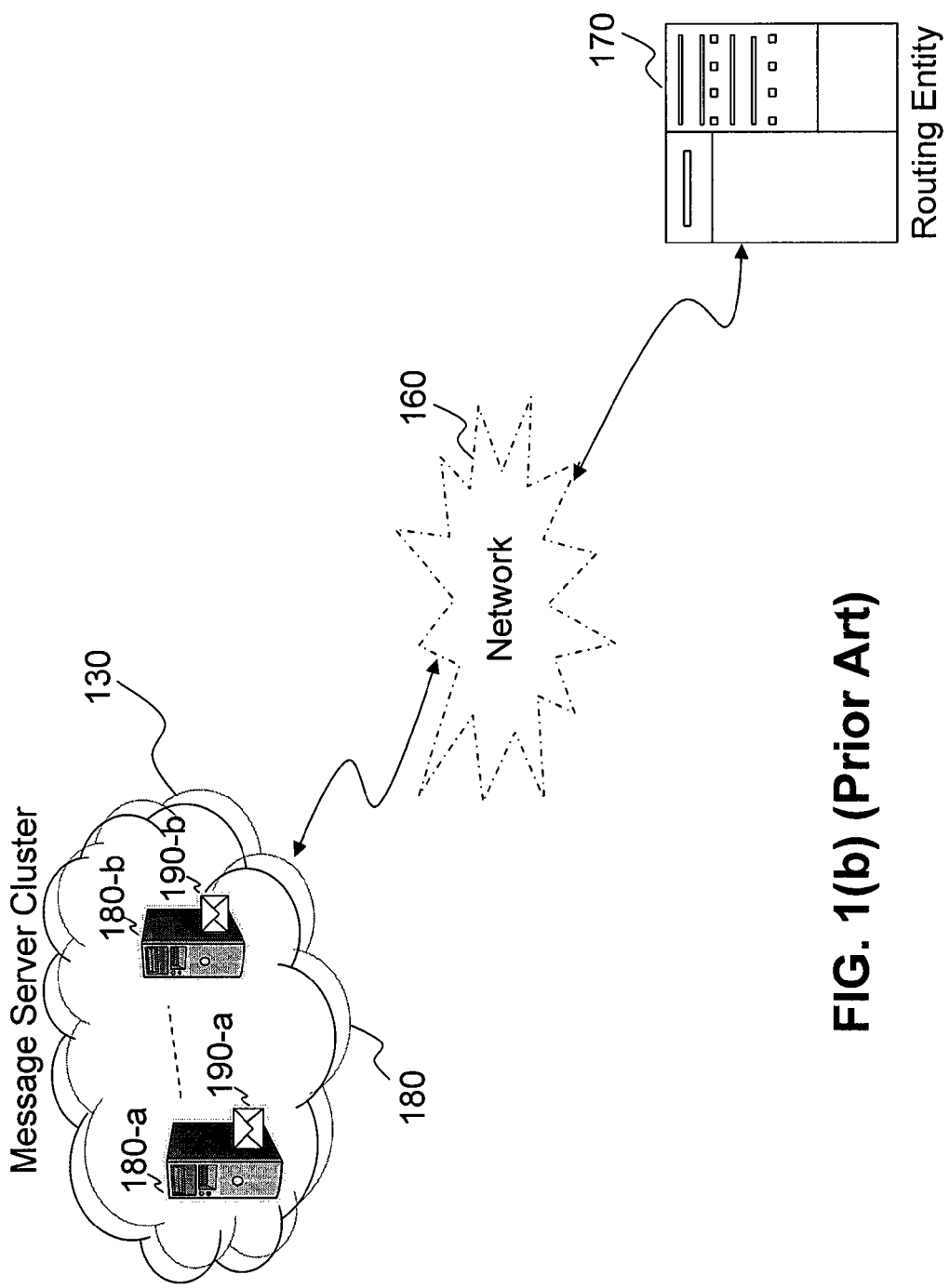
FIG. 1(b) (Prior Art) shows a conventional solution to provide improved short message services.

Each message server, e.g., message server 210-*a*, in the message server cluster 210 is configured to receive a SMS transmission request from a source, e.g., a network application and then send the request via an available bind selected from its bind pool to the routing entity 240 via a network (see FIG. 1(*a*) and FIG. 1(*b*)). The network can be any operational network, including a local area network (LAN), a wide area network (WAN), the Internet, an IP network, X.25 network, a public switched telephone network (PSTN), a wireless network, a wired network, a proprietary network, a virtual network, or any combination thereof. For example, when a message server sends a received short message and the request to the routing entity 240, the connection may be made via different routers or nodes which may be a part of a wireless network, a wired network, an IP network, X.25 network, the Internet, a virtual network, a proprietary network, a PSTN network, or any combination thereof. The message delivery mechanism, as described herein, may also be used for forwarding notification messages. For example, notification messages issued from one or more computer servers responsive to requests of their clients (e.g., other carrier computers) may also be sent to the message server cluster in order to forward such notification messages to corresponding carrier's mobile service customers. In such applications, the notification messages may be queued in a message queue in the form of short messages and the message server cluster will then deliver the notification messages to the routing entity 240.

Figure 3:
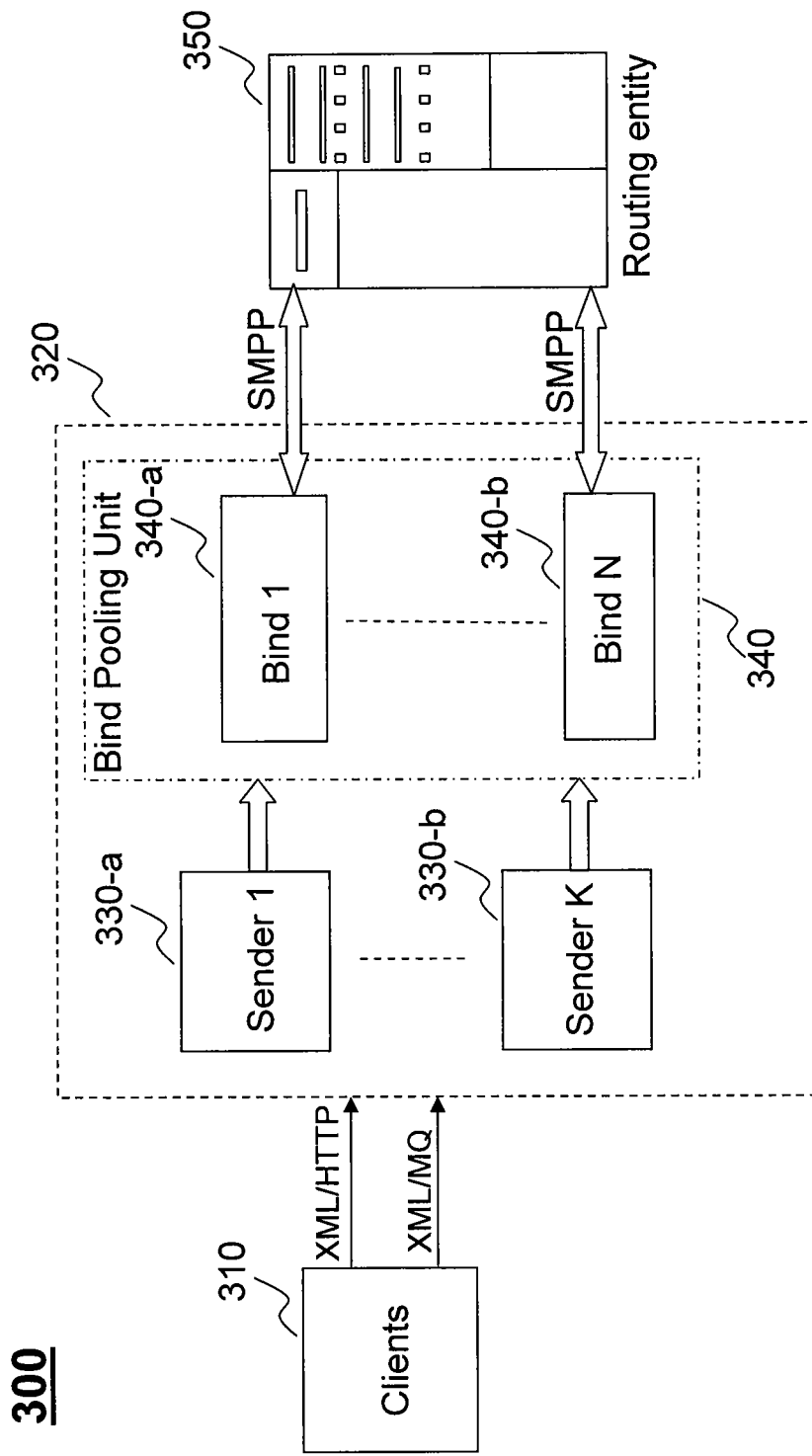
FIG. 3 depicts a message server which may host multiple application threads for short message sending applications in connection with a bind pooling unit, according to an embodiment of the present teaching.

To send a message to the routing entity 240, a message server in the message server cluster 210 accesses a bind deemed as available from its associated bind pool. Such an available bind can be selected based on some criteria. FIG. 3 depicts a message server 320 which may host multiple application threads for short message sending applications in connection with a bind pooling unit 340. In the illustrated embodiment 300, there are a plurality of short message sender application threads, sender 1 330-*a*, . . . , and sender K 330-*b*. Each of the sender application threads receives short messages from different clients (310). As discussed above, such clients may be a computer server requesting notification services. The received short messages may be compiled in different formats such as eXtensible Markup Language (XML) originated from a hypertext transfer protocol (HTTP) or XML from a message queue (MQ). For a sender application thread to forward a short message with a request (which may incorporate information describing an intended recipient) to the routing entity 350, it has to bind with the routing entity 350 using one of the binds selected by the bind pooling unit 340. To do so, the sender application thread requests a bind from the bind pooling unit 340, which manages and pools a plurality of N binds, 340-*a*, . . . , 340-*b*. Each bind can be selected by the bind pooling unit 340, when certain conditions are met (as discussed below), to facilitate sending of short messages. The sender application thread utilizes a pre-established bind to connect with the routing entity 350 such as a SMPP gateway and send the short message packaged as a SMPP gateway message to the routing entity 350.

The bind pooling unit 340 is configured and implemented as an abstraction layer between the short message sender application threads and the routing entity 350 so that a throttle will no longer occur. This is because each bind now in a bind pool managed by the bind pooling unit 340 is configured to be associated with a delay time before it can be used by any sender application thread. The delay time is determined based on, at least partially, the operational parameters of the routing entity so that, given the capacity of the routing entity, any bind, when the delay time is applied, will not throttle. Although a sender application thread may still be blocked when there is no bind available from the bind pool, such a blocking is placed on a thread rather than on a bind so that the traditional problems associated with a bind that throttles will no longer occur. That is, any stalling on sending short messages is applied to an application thread independent of any bind so that problems caused by a throttle bind will no longer be present. Details of such a bind pooling unit and its exemplary implementation are described below.

Figure 4:
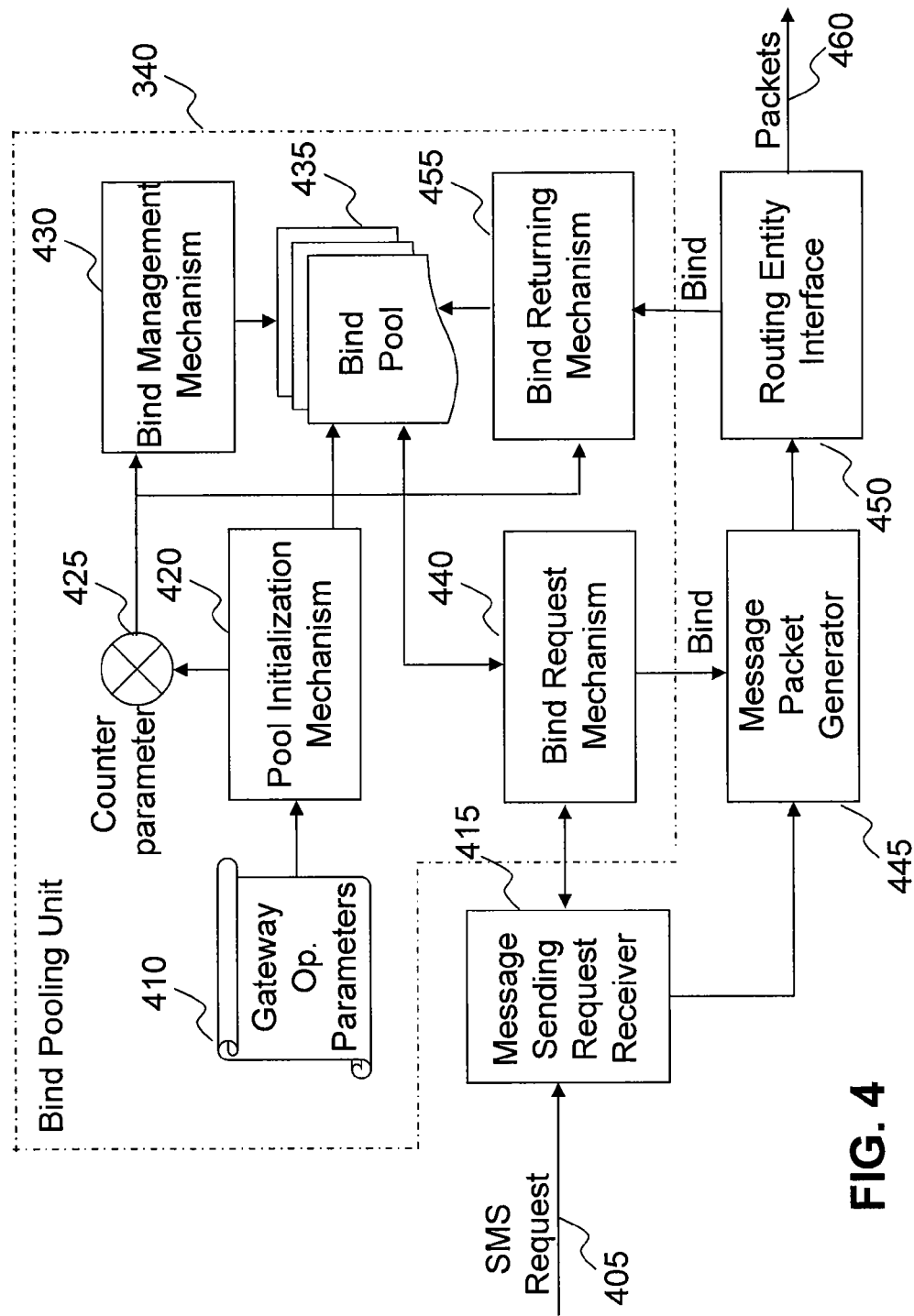
FIG. 4 is a system diagram of an exemplary bind pooling unit and its relationship with other components of a message server, according to an embodiment of the present teaching.

FIG. 4 is a system diagram of an exemplary bind pooling unit 340 and its relationship with other components of a message server, implemented to provide SMS services according to an embodiment of the present teaching. In this exemplary embodiment, the bind pooling unit 340 comprises a bind pool 435, a pool initialization mechanism 420, a bind management mechanism 430, a bind request mechanism 440, and a bind returning mechanism 455. To establish the bind pool 435, a pool initialization mechanism 420 accesses operational parameters associated with the routing entity to which the message server is to be connected in order to send short messages. Such parameters include the number of messages allowed per second by the routing entity and are used to configure the bind pool 435.

In accordance with the present teaching, each of the binds in the bind pool is configured by the pool initialization mechanism 420 to have a delay time between each use. In the disclosed embodiment, this delay time is computed based on the number of messages allowed per second on the routing entity 350. For example, when the routing entity is a SMPP gateway, the delay time for each bind is computed as $P=(1,000/R)-Tp$, where R is the number of SMPP gateway messages allowed per second on the routing entity, Tp is the elapsed time to send the previous message on the same bind, and P is the delay time measured in milliseconds. Given this formula, the time that the bind can be used to send the next message can be determined as $Tn=Tc+(1,000/R)-Tp$, where Tn is the time to send the next message and Tc denotes current time. Such computed delay time P is recorded in a storage 425 as a counter parameter, which may be used to implement a counter associated with each bind to be delayed. Based on this counter parameter specifying a delay time, the bind management mechanism 430 manages the bind pool 435 accordingly. Details about managing the bind pool are described with reference to FIG. 5.

In operation, a message server hosting one or more short message sender applications includes a message sending request receiver 415, that receives message sending requests from one or more short message sender applications. Upon receiving such a request, the message sending request receiver 415 forwards the request to the bind request mechanism 440 to obtain a bind to be used by the message server to send a message to the routing entity. The bind request mechanism 440 then queries the bind pool to see whether a bind is available for the next request.

When a bind is retrieved from the bind pool, the bind request mechanism 440 sends the retrieved bind to a message packet generator 445. In addition, the message sending request receiver 415 forwards the short message to be sent to the message packet generator 445. Based on the bind and information related to the message to be sent to the routing entity 350, the message packet generator 445 generates a protocol data unit (PDU) corresponding to the message to be sent and sends the PDU to a routing entity interface 450. The routing entity interface 450 may be responsible for transforming the PDU from the message packet generator 445 into a packet complying with a certain protocol (e.g., SMPP) and then send the data packet to the routing entity using the bind. After the packet is sent off, the routing entity interface 450 sends information related to the bind to the bind returning mechanism 455 so that the bind can be recycled back to the bind pool. When the bind returning mechanism 455 recycles the bind, it retrieves the counter information from 425 so that the configured delay time P, as disclosed herein, can be applied to the bind.

The bind pooling unit 340, as described herein, may also be implemented with flexible or re-configurable capabilities. For example, the bind pool may be dynamically re-configured in accordance with the gateway operational parameters stored in 410. The operational parameters associated with the routing entity may be periodically accessed and used to re-configure the bind pooling mechanism 340. In certain situations, the number of messages allowed per second by the routing entity may be lowered or improved over time. In those situations, the bind pooling mechanism can adapt to the dynamic situation by amending the counter 425 so that the delay time for each bind is adjusted accordingly to meet the new operational condition.

Figure 5:
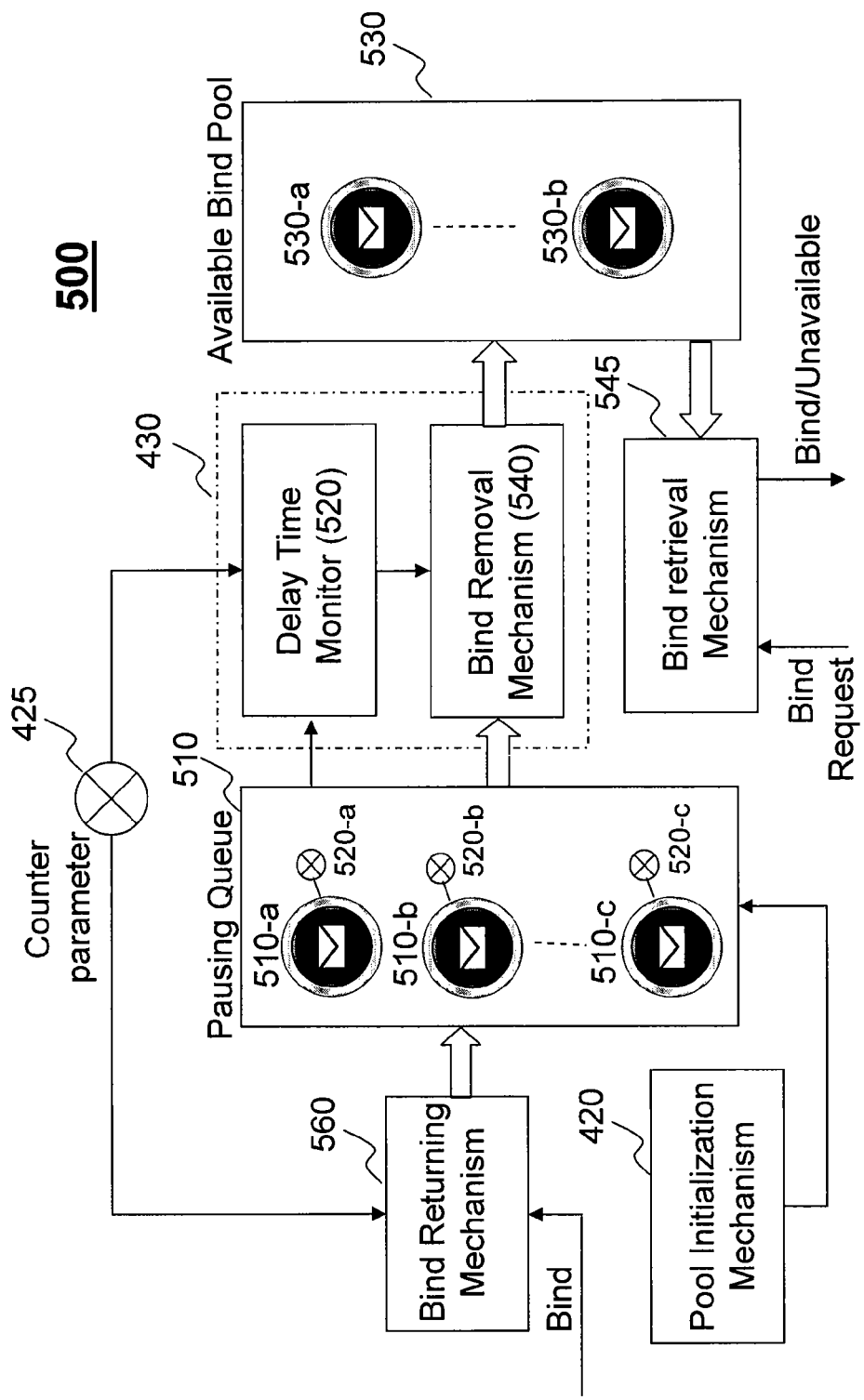
FIG. 5 depicts an exemplary construct of the bind pool and its relationship with other components of the bind pooling unit, according to an embodiment of the present teaching.

FIG. 5 depicts an exemplary construct of the bind pool 435 and its relationship with other components of the bind pooling unit 340, according to an embodiment of the present teaching. In this illustrated embodiment, the bind pool 435 comprises two logically separate groups of binds, one is a pausing queue 510, having binds that are still being delayed and unavailable, and the other is an available bind pool 530. Although shown as separate groups, in implementing the bind pooling unit 340, these two groups may also be realized as a combined group having binds therein with different status, e.g., available and unavailable. For instance, a delay queue may be used to implement such a combined structure. The pausing queue 510 may include zero or more binds 510-a, 510-b, . . . , and 510-c. Each bind in this pausing queue is a bind that is made to pause for a delay period and, therefore, not yet available for use to send a message from the message server to the routing entity. However, a bind that is being paused may be used by the message server to receive a message from the routing entity. That is, if the message forwarding is in the reverse direction, any bind, either still has an unfinished pausing time or available, may be used to receive a message.

Each of the binds in the pausing queue may be associated with a counter, which is initialized based on the counter parameter 425 and monitored based on the current status of the counter to determine, e.g., how much longer the pausing is going to continue. As shown in FIG. 5, bind 510-a is associated with a counter 520-a, bind 510-b is associated with its counter 520-b, . . . , bind 510-c is associated with its own counter 520-c. Each of the counters may have a different value at any time instant which may count down from a required pausing time (or counter parameter) determined based on the operational parameters of the routing entity. Such counters may be implemented as built-in with the binds. Such a counter may also be implemented as a timer (not shown), which can be used to monitor the time paused with respect to a configured required delay period 425. Any bind is placed in this pausing queue before it can be used by the message server to send a message to the routing entity.

Initially, the pool initialization mechanism 420 puts all binds of the underlying message server into the pausing pool and initializes each with, e.g., a required delay period or a counter value. In some embodiments, the required delay period for each and every bind in the pausing pool is the same. In some embodiments, the required delay period for each bind in the pausing pool may differ, depending, e.g., on the elapsed time required to send the previous message. This difference may be due to the dynamics of the gateway operational environment or condition. The shortest required delay may be determined based on the operational parameters of the routing entity but it is not necessary to demand that all bind will be delayed for that amount of time.

Whenever a bind completes the required delay period, it is moved to the available bind pool 530. In implementation, it may not involve actual move but rather a status change. In some embodiments, unavailable and available binds are stored in the same data structure and in this case, each may be flagged with a status. Once a bind is in an available status, it can be used by the message server to send a message to the routing entity. The bind management mechanism 430 (see FIG. 4) is responsible for monitoring the delay time for each bind in the pausing queue and dynamically managing the status of each bind according to their remaining delay period. In this illustrated embodiment, the bind management mechanism 430 comprises a delay time monitor 520 and a bind removal mechanism 540. The delay time monitor 520 is responsible for monitoring the remaining delay time of each bind in the pausing queue 510 and when a bind is detected to have gone through the required delay time, the delay monitor 520 invokes the bind removal mechanism 540 to remove the bind from the pausing queue 510 and insert the bind into the available bind pool 530. As discussed herein, in actual implementation, the bind mechanism 430 may be automatically built in with the bind pool itself.

Once a bind becomes available, it is available for being used to send messages to the routing entity. At any given time, the available bind pool 530 may have zero or more binds that are available to be used by the message server to send messages to the routing entity. A bind retrieval mechanism 545 is used to retrieve an available bind from the available bind pool 530 upon receiving a bind request. If the available bind pool 530 is not empty, the bind retrieval mechanism 545 retrieves a bind and returns the retrieved bind. If the available bind pool 530 is empty (i.e., no bind has yet completed its delay time), the bind retrieval mechanism 545 returns a signal indicating unavailability or in some situations, may block indefinitely or may allow time-out. When multiple binds are present in the available bind pool 530, certain priority schemes may be applied to the binds therein so that they will be accessed in accordance with the priority. For example, first in first out policy may be applied so that the bind that exists in the available bind pool 530 the longest will have the top priority to be used in the next retrieval. Accordingly, the available bind pool 530 may be implemented as a queue. In some embodiments, a priority scheme in which the most recent available bind may be used for the next retrieval. In this case, a stack may be implemented to achieve that. In some embodiments, the bind pool can be implemented based on a Java delay queue which allows it to select a bind, whenever a request for a bind is received, from the bind pool that has been idle the longest to avoid throttling.

Once a bind has been used, it is returned (e.g., from the routing entity interface 450) to the bind returning mechanism 560, which then re-initialize the delay time of the bind in accordance with the counter parameter 425 and places the bind with its associated individualized counter into the pausing queue. The pausing queue as shown in FIG. 5 may represent one possible implementation of the pool for unavailable binds. As will be understood by a person skilled in the art, any other implementation is also possible. The present teaching is not limited to the specific illustration employed herein. Any other implementation is within the scope of the present teaching as long as the functionalities described herein can be achieved.

Figure 6:
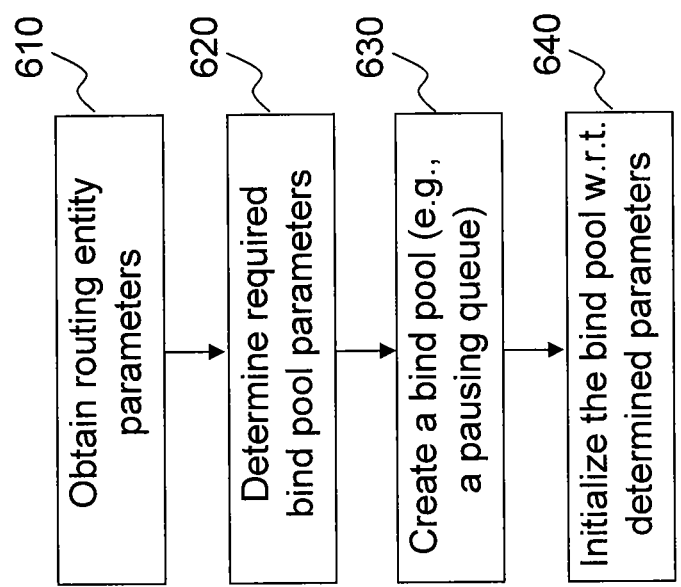
FIG. 6 is a flowchart of an exemplary process in which a bind pool is configured based on the operational parameters of a routing entity, according to an embodiment of the present teaching.

FIG. 6 is a flowchart of an exemplary process in which a bind pool is configured based on the operational parameters of a routing entity, according to an embodiment of the present teaching. In this exemplary process, operational parameters of a routing entity are first obtained at 610. Based on the obtained operational parameters, various parameters related to the bind pool may be determined at 620. This includes the delay time that needs to elapse for each bind before it can be used and can be stored as a counter parameter. Using such determined bind pool parameters, the bind pool initialization mechanism 420 creates a bind pool at 630 and initializes each bind in the bind pool at 640 with counter parameter determined at 620.

Figure 7:
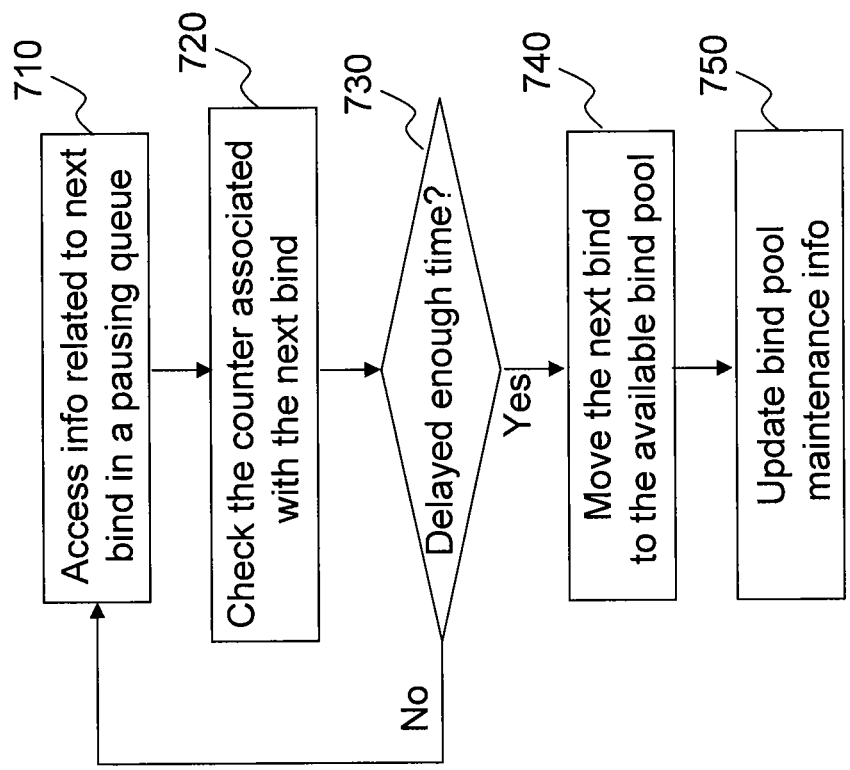
FIG. 7 is a flowchart of an exemplary process of managing a bind pool with an individually set delay time schedule, according to an embodiment of the present teaching.

FIG. 7 is a flowchart of an exemplary process of managing a bind pool with individually set delay time schedules, according to an embodiment of the present teaching. The bind pool management is performed by the pool management mechanism 430, which includes a delay time monitor 520 and a bind removal mechanism 540 (see FIG. 5). As illustrated in FIG. 5, there may be two structures that need to be managed. However, other implementations such as one with both structures realized as one may also be possible. When there are two logical structures, one is the pausing queue 510 and the other is the available bind pool 530. At 710, the next bind in the pausing queue 510 is accessed to check, at 720 by the delay time monitor 520, the associated counter value to determine the remaining delay time associated with the next bind. If the counter for the next bind is up, determined at 730, the bind removal mechanism 540 is invoked to move, at 740, the next bind from the pausing queue 510 to the available bind pool 530. Upon removal, the corresponding bind pool maintenance information is updated at 750.

Figure 8:
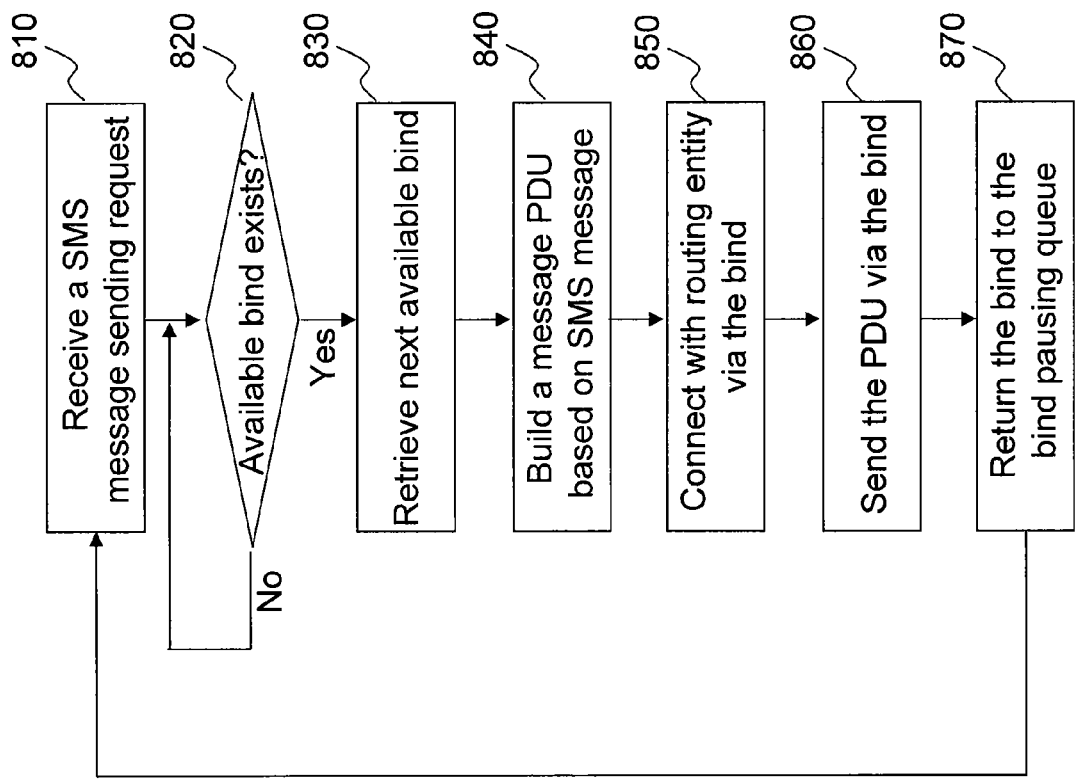
FIG. 8 is a flowchart of an exemplary process in which a short message request is handled based on a bind from a bind pool constructed and managed in accordance with an embodiment of the present teaching.

FIG. 8 is a flowchart of an exemplary process in which a short message request is handled based on a bind from a bind pool constructed and managed in accordance with an embodiment of the present teaching. A SMS message sending request is first received at 810. To forward the short message to a routing entity, it is checked, at 820, to see whether the available bind pool has any bind available for sending the short message to the routing entity. If it is available, determined at 820, the next available bind is retrieved at 830. As discussed herein, schemes to determine which one of the available binds is to be selected may vary. For example, in some embodiments, a round robin scheme may be implemented. In some embodiments, a first in first out (FIFO) scheme may be deployed. Sometimes, it is also possible to implement a scheme in which the last one in is selected (e.g., a stack). It is also possible to use a random selection scheme to retrieve an available bind.

Based on the retrieved available bind, the message server proceeds with sending a short message to the routing entity. A PDU is generated, at 840, based on the short message received. To send the PDU to the routing entity, the bind is used, at 850, to allow the message server to send the message to the routing entity. The PDU is then sent, at 860, to the routing entity. After that, the bind, which has been used to send the short message to the routing entity, is returned, at 870, to the bind pool or specifically the pausing queue 510 with a re-set counter for a configured amount of delay before it can be used next time.

Figure 9:
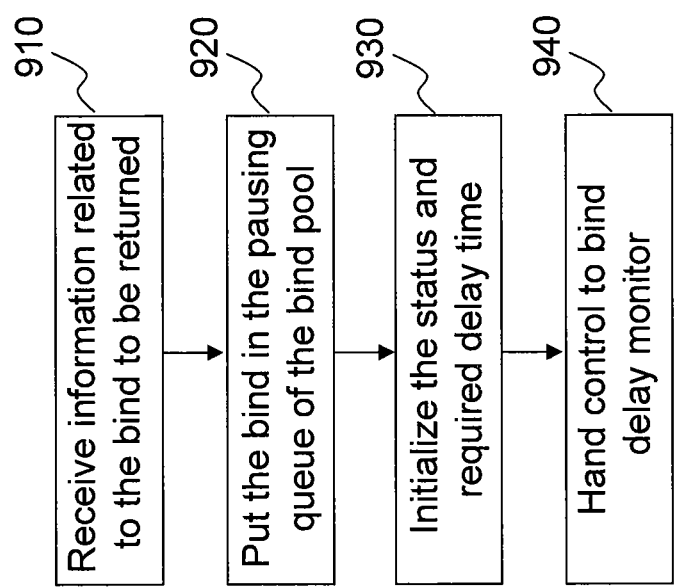
FIG. 9 is a flowchart of an exemplary process in which a bind is returned to the bind pool after it is used to send a message to a routing entity, according to an embodiment of the present teaching.

FIG. 9 is a flowchart of an exemplary process in which a bind is returned to the bind pool after it is used to by a message server to send a message to a routing entity, according to an embodiment of the present teaching. This is an operation performed by the bind returning mechanism 560. At 910, information related to the bind to be returned is received, e.g., from the routing entity interface 450. The bind returning mechanism 560 then places, at 920, the bind to be returned in the pausing queue 510 and re-initializes, at 930, its status, e.g., as to its required delay time by resetting the associated counter. Such re-initialization may be performed based on the configuration information (e.g., required delay time) computed in accordance with the operational parameters of the routing entity. Once the bind is put in the pausing queue with appropriate configuration, the control is handed back, at 940, to the bind management mechanism 430 to monitor the delay time of the bind.

Computer hardware platforms may be used as the hardware platform(s) for one or more of the elements (e.g., the message sending request receiver 415, the pool initialization mechanism 420, the bind management mechanism 430, the bind request mechanism 440, the message packet generator 445, the routing entity interface 450, and the bind returning mechanism 455) of a message server. A network or host computer platform may typically be used to implement a server. The hardware elements, operating systems and programming languages of such computers are conventional in nature, and it is presumed that those skilled in the art are adequately familiar therewith. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 10:
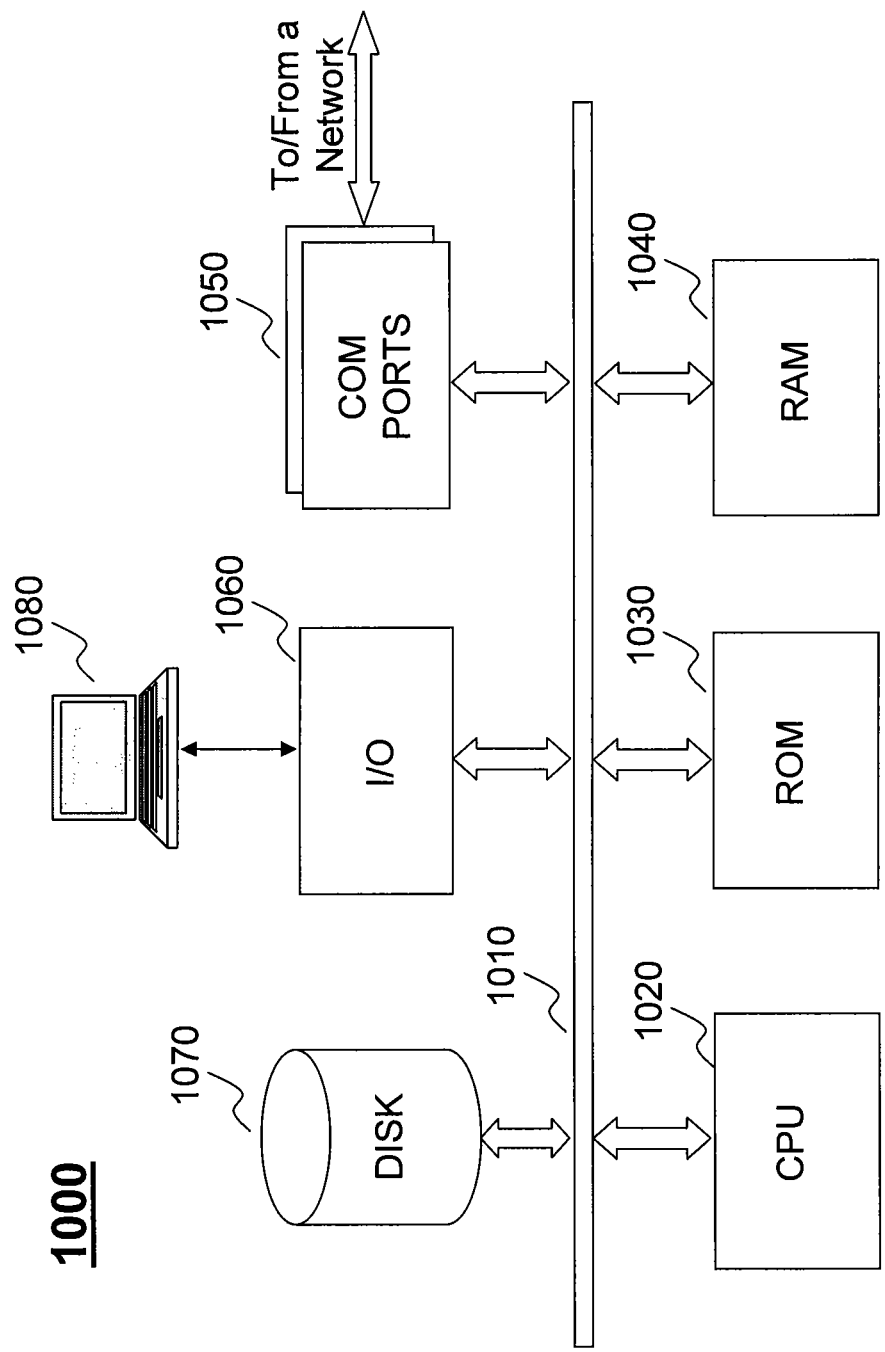
FIG. 10 depicts a general computer architecture on which the present teaching can be implemented.

FIG. 10 provides functional block diagram illustrations of general purpose computer hardware platforms with user interface elements. This general purpose computer 1000 with hardware platforms and user interface elements can be used to implement an ESME server and the components related to a bind pooling mechanism and their corresponding functionalities as discussed herein. The server 1000, for example, includes COM ports 1050 connected to and from a network connected thereto to facilitate data communication. The server 1000 also includes a central processing unit (CPU) 1020, in the form of one or more processors, for executing program instructions. The server platform typically includes an internal communication bus 1010, program storage and data storage of different forms, e.g., disk 1070, read only memory (ROM) 1030, and random access memory (RAM) 1040, for various data files to be processed and/or communicated by the server, as well as possibly program instructions to be executed by the CPU. The server 1000 also includes an I/O component 1060, supporting input/output flows between the server and user interface elements 1080. In some embodiments, the server 1000 may also receive programming and data via network communications.

The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. Hence, aspects of the methods of receiving message sending requests through a common communication port in a server or network device from a variety of client applications, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory of the computers, processors or the like, or associated modules thereof, such as various semiconductor memories, tape drives, disk drives and the like, which may provide storage at any time for the software programming.

All or portions of the software may at times be communicated through the Internet or various other telecommunication networks. Such communications, for example, may enable loading of the software from one computer or processor into another, for example, from a management server or host computer of the network operator or carrier into the platform of the message server or other device implementing a message server or similar functionality. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the message server implementation described above is embodied in a hardware device, it can also be implemented as a software only solution—e.g., requiring installation on an existing server. In addition, a message server or a bind pooling mechanism as disclosed herein can also be implemented as a firmware, firmware/software combination, firmware/hardware combination, or hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method, comprising the steps of:
   receiving, by a message server located in a cluster of one or more message servers, a request to send a mobile network message service message to a specified recipient;
   accessing, from a bind pool having a plurality of binds, an available bind for sending the mobile network message service message from the message server to a routing entity;
   connecting the message server to the routing entity via the available bind; and
   sending, by the message server using the available bind and via a network, the mobile network message service message to the routing entity through which the message is to be forwarded to the specified recipient,
   wherein the step of accessing the available bind includes selecting the available bind from among the plurality of binds in the bind pool based on a status of each bind in the bind pool as being one of an available status and a pausing status, such that a bind having the pausing status is not selected for sending the mobile network message service message for a predetermined delay associated with the respective bind, the predetermined delay determined based on a number of messages allowed per second on the routing entity and a time elapsed to send a previous message using the respective bind.

2. The method of claim 1, wherein:
   the message server includes one of:
      an external short message entity (ESME) server;
      a short message service center (SMSC) server; and
      a short message peer to peer (SMPP) server; and
   the routing entity includes one of:
      an SMPP gateway;
      an ESME gateway; and
      an SMSC gateway.

3. The method of claim 1, wherein the network corresponds to at least one of:
   a wireless network;
   a local area network (LAN);
   a wide area network (WAN);
   an Internet Protocol (IP) network;
   an X.25 network;
   a public switched telephone network (PSTN);
   a public network;
   a proprietary network; and
   a virtual network; and
   any combination thereof.

4. The method of claim 1, further comprising maintaining the bind pool, which comprises the steps of:
   creating the bind pool; and
   managing the bind pool.

5. The method of claim 4, wherein the step of creating comprises:
   obtaining at least one operational parameter of the routing entity;

generating the bind pool with the plurality of binds; and
initializing each bind in the bind pool by assigning the status to the respective bind as one of the available status and the pausing status, wherein
a bind in the pausing status is not available for being used by the message server to send a message to the routing entity.

6. The method of claim 1, wherein the predetermined delay associated with each bind in the pausing status is determined based on formula P=(1000/R)–Te, where P is the predetermined delay in milliseconds, R is the number of messages allowed per second on the routing entity, and Te is the time elapsed to send the previous message using the respective bind.

7. The method of claim 4, wherein the step of managing the bind pool comprises the steps of:
checking a bind that has the pausing status as to whether the bind has been paused for the predetermined delay;
if the bind has paused for the predetermined delay, changing the status of the bind to available;
repeating the steps of checking and changing for each and every bind that has the pausing status.

8. The method of claim 1, further comprising the step of returning the available bind to the bind pool after the sending step.

9. The method of claim 8, wherein the step of returning comprises:
receiving, by a bind returning mechanism from a routing entity interface, information related to the bind to be returned;
placing, by the bind returning mechanism, the bind in a pausing queue of the bind pool; and
re-initializing a status of the bind with the predetermined delay.

10. The method of claim 1, wherein the mobile network message service message is a short message service (SMS) message, a mobile multimedia service (MMS) message, or an enhanced messaging service (EMS) message.

11. A message server system for message service via network connections, comprising:
at least one computer having a processor; and
one or more message servers forming a cluster, wherein each of the message servers are located on one of the at least one computer and receives a request to send a mobile network message service message to a specified recipient and sends the mobile network message service message to a routing entity which forwards the mobile network message service message to the specified recipient, wherein each of the message servers includes:
(a) a plurality of binds, from a bind pool, wherein each of the plurality of binds is for connecting the message server to a routing entity, for sending the mobile network message service message from the message server to the routing entity,
(b) a bind pooling mechanism to facilitate a selection of an available bind from the bind pool, and
(c) a routing entity interface to facilitate the message server, via a network, to send the mobile network message service message to the routing entity based on the selected available bind so that the mobile network message service message directed to the specified recipient can be forwarded to the specified recipient by the routing entity,
wherein the bind pooling mechanism is configured to select the available bind from among the plurality of binds in the bind pool based on a status of each bind in the bind pool as being one of an available status and a pausing status, such that a bind having the pausing status is not selected for sending the mobile network message service message for a predetermined delay associated with the respective bind, the predetermined delay determined based on a number of messages allowed per second on the routing entity and a time elapsed to send a previous message using the respective bind.

12. The system of claim 11, wherein each message server includes one of:
an external short message entity (ESME) server;
a short message service center (SMSC) server; and
a short message peer to peer (SMPP) server.

13. The system of claim 11, wherein the routing entity includes one of:
a short message peer to peer (SMPP) gateway;
an external short message entity (ESME) gateway; and
a short message peer to peer (SMSC) gateway.

14. The system of claim 11, wherein the bind pooling mechanism comprises:
a bind pool initialization mechanism configured for creating the bind pool and setting the configuration thereof;
a bind management mechanism for maintaining the bind pool during operation of the message server in accordance with the configuration; and
a bind request mechanism for accessing the bind pool and selecting the available bind from the bind pool, wherein
a configuration for each bind in the bind pool includes the predetermined delay determined based on at least one operational parameter of the routing entity.

15. The system of claim 14, wherein the predetermined delay for each bind in the pausing status is set based on formula P=(1000/R)–Te, where P is the predetermined delay in milliseconds, Te is the time elapsed to send the previous message using the bind, and R is the number of messages allowed per second by the routing entity.

16. The system of claim 14, wherein the bind management mechanism comprises:
a delay time monitor configured for monitoring an elapse of delay time with respect to each bind having the pausing status to ensure the predetermined delay in the pausing status associated with the bind; and
a bind removal mechanism configured for changing the pausing status associated with the bind to the available status whenever the bind is delayed for the predetermined delay.

17. The system of claim 14, further comprising:
a bind returning mechanism configured for placing the available bind that has been used by the message server to send a message to the routing entity back in the bind pool,
wherein the bind being placed back in the bind pool is re-initialized to be delayed for the predetermined delay before the bind being placed back in the bind pool is made available.

18. The system of claim 11, wherein the mobile network message service message is a short message service (SMS) message, a mobile multimedia service (MMS) message, or an enhanced messaging service (EMS) message.

19. An article of manufacture, comprising:
at least one non-transitory machine readable medium; and
programming embodied in the at least one medium,
wherein execution of the programming by a processor of each of one or more elements implements functions, including functions to:
receive, by a message server located in a cluster of one or more message servers a request to send a mobile network message service message to a specified recipient;

access, from a bind pool having a plurality of binds, an available bind for sending the mobile network message service message from the message server to a routing entity;

connect the message server to the routing entity via the available bind; and send, by the message server using the available bind and via a network, the mobile network message service message to the routing entity through which the message is to be forwarded to the specified recipient, wherein the function of accessing the available bind includes a function to select the available bind from among the plurality of binds in the bind pool based on a status of each bind in the bind pool as being one of an available status and a pausing status, such that a bind having the pausing status is not selected for sending the mobile network message service message for a predetermined delay associated with the respective bind, the predetermined delay determined based on a number of messages allowed per second on the routing entity and a time elapsed to send a previous message using the respective bind.

20. The article of claim 19, wherein the message server includes one of:

an external short message entity (ESME) server;
a short message service center (SMSC) server; and
a short message peer to peer (SMPP) server.

21. The article of claim 19, wherein the routing entity includes one of:

a short message peer to peer (SMPP) gateway;
an external short message entity (ESME) gateway; and
a short message service center (SMSC) gateway.

22. The article of claim 19, where the bind pool is created via the steps of:

obtaining at least one operational parameter of the routing entity;

generating the bind pool with the plurality of binds; and initializing each bind in the bind pool by assigning the status to the respective bind as one of the available status and the pausing status, wherein a bind in the pausing status is not available for being used by the message server to send a message to the routing entity.

23. The article of claim 19, wherein the predetermined delay associated with each bind in the pausing status is determined based on formula $P=(1000/R)-Te$, where P is the predetermined delay in milliseconds, R is the number of messages allowed per second on the routing entity, and Te is the time elapsed to send the previous message using the respective bind.

24. The article of claim 19, wherein the functions include a further function to return the available bind to the bind pool after the sending step.

25. The article of claim 24, wherein the function of returning comprises:

receiving, by a bind returning mechanism from a routing entity interface, information related to the bind to be returned;

placing, by the bind returning mechanism, the bind in a pausing queue of the bind pool; and re-initializing a status of the bind with the predetermined delay.

* * * * *